(12) United States Patent
Corning

(10) Patent No.: US 7,238,240 B2
(45) Date of Patent: Jul. 3, 2007

(54) METHOD OF APPLYING HYDROCARBON BARRIER TO A PLASTIC FUEL TANK

(75) Inventor: Donald Corning, Flint, MI (US)

(73) Assignee: Don Corning, Flint, MI (US)

( * ) Notice: Subject to any disclaimer, the term of this patent is extended or adjusted under 35 U.S.C. 154(b) by 316 days.

(21) Appl. No.: 10/364,085

(22) Filed: Feb. 11, 2003

(65) Prior Publication Data

US 2003/0155680 A1    Aug. 21, 2003

Related U.S. Application Data

(60) Provisional application No. 60/358,522, filed on Feb. 21, 2002.

(51) Int. Cl.
*C23C 16/00* (2006.01)
*B65G 49/00* (2006.01)

(52) U.S. Cl. .................. 118/719; 118/254; 118/306; 118/731; 198/404; 198/406; 198/408

(58) Field of Classification Search ............... 118/718, 118/719, 254, 731, 306; 198/304
See application file for complete search history.

(56) References Cited

U.S. PATENT DOCUMENTS

| 2,879,882 | A | * | 3/1959 | Whelan | 198/404 |
| 3,983,597 | A | * | 10/1976 | Neumann | 15/304 |
| 4,319,543 | A | * | 3/1982 | Shank | 118/503 |
| 5,849,366 | A | * | 12/1998 | Plester | 427/491 |
| 6,209,705 | B1 | * | 4/2001 | Drewitz | 198/404 |
| 6,758,910 | B2 | * | 7/2004 | Schmoyer | 118/715 |
| 2004/0081756 | A1 | * | 4/2004 | Coots et al. | 427/240 |

* cited by examiner

*Primary Examiner*—Karla Moore
(74) *Attorney, Agent, or Firm*—Dickinson Wright, PLLC

(57) ABSTRACT

The subject invention relates to a method of applying the hydrocarbon barrier inside plastic fuel tanks. The plastic fuel tanks are supported on a carrier in an upright position for movement in a loop through inverted positions. While upright, hot and dry air treats the inside of the plastic fuel tanks followed by injecting $SO_3$ inside the plastic fuel tanks through the nozzles. The $SO_3$ is extracted from the plastic fuel tanks followed by injecting ammonia into the tanks through a second nozzle. After extracting ammonia from the plastic fuel tanks, the tanks are inverted and drained followed by a rinsing with a high pressured water and drying with hot air.

2 Claims, 4 Drawing Sheets

METHOD OF APPLYING HYDROCARBON BARRIER TO A PLASTIC FUEL TANK

RELATED APPLICATION

The subject application claims priority to provisional application 60/358,522 filed Feb. 21, 2002.

TECHNICAL FIELD

The subject invention relates generally to a fuel tank hydrocarbon barrier and, more particularly, to a method of applying the hydrocarbon permeation barrier inside the plastic fuel tanks.

BACKGROUND OF THE INVENTION

There are several technologies for manufacturing of plastic fuel tanks currently available in an automotive industry. One of the technologies known in the art includes two or more pieces of coated steel combined with classical metal joining technologies. Another technology comprises blow molding of a thermoplastic polymer melt. The molded plastic tanks are more expensive, but have significant design and flexibility advantages compared with metal tanks. Both technologies do not provide an effective hydrocarbon barrier for a plastic fuel tank.

There is a big concern with automotive generated pollutants. There is also an immediate need for an improved gasoline tank technology that would be capable of allowing the use of oxygenated fuel additives without deleterious evaporative effects while maintaining the cost and design advantages associated with existing tank technologies.

Nanocomposites, known to one skilled in the art, may solve the current problem with air pollution and hydrocarbon emissions. The nanocomposites may slow transmission of gases and moisture vapor through plastics by creating so called "tortuous path" for gas molecules. Based on recent EPIC studies, nanocomposites, commercially beneficial, may be used for reducing hydrocarbon emissions from hoses, seals, auto fuel-system components and the like. However the use of nanocomposites may still be expensive.

Therefore, it would be desirable to come up with a cost and time effective method of creating a strong hydrocarbon barrier inside the plastic fuel tanks to prevent hydrocarbon emissions that could cause pollution an explosion of a gas tank.

SUMMARY OF THE INVENTION

The present invention provides a method of applying a hydrocarbon permeation barrier inside plastic fuel tanks including the steps of pre-heating the interior of the tank with air, injecting a hydrocarbon barrier substance into a fuel tank while the tank is upright, withdrawing the barrier substance from the tank, injecting a neutralizing substance into the tank, inverting the tank and draining the neutralizing substance, and drying the interior of the tank.

In order to perform the method the invention includes a conveyor line comprising an endless loop conveyor entrained around a spaced pair of sprockets to create an upper plurality of stations and a lower plurality of stations. A plurality of carriers support the tanks on the conveyor as each of the carriers include a plate with a hole therethrough for receiving the spout of a fuel tank. A retainer engages the spout of the fuel tank extending through the hole for retaining the tank to the carrier.

The advantage of the present invention is a cost effective, time effective method of applying SO3 with further application of the ammonia to create a strong hydrocarbon barrier inside the plastic fuel tanks.

The advantages of the invention will become apparent to one skilled in the art from the following detailed description of the preferred embodiments.

DETAILED DESCRIPTION OF THE PREFERRED EMBODIMENT

Figure 1:
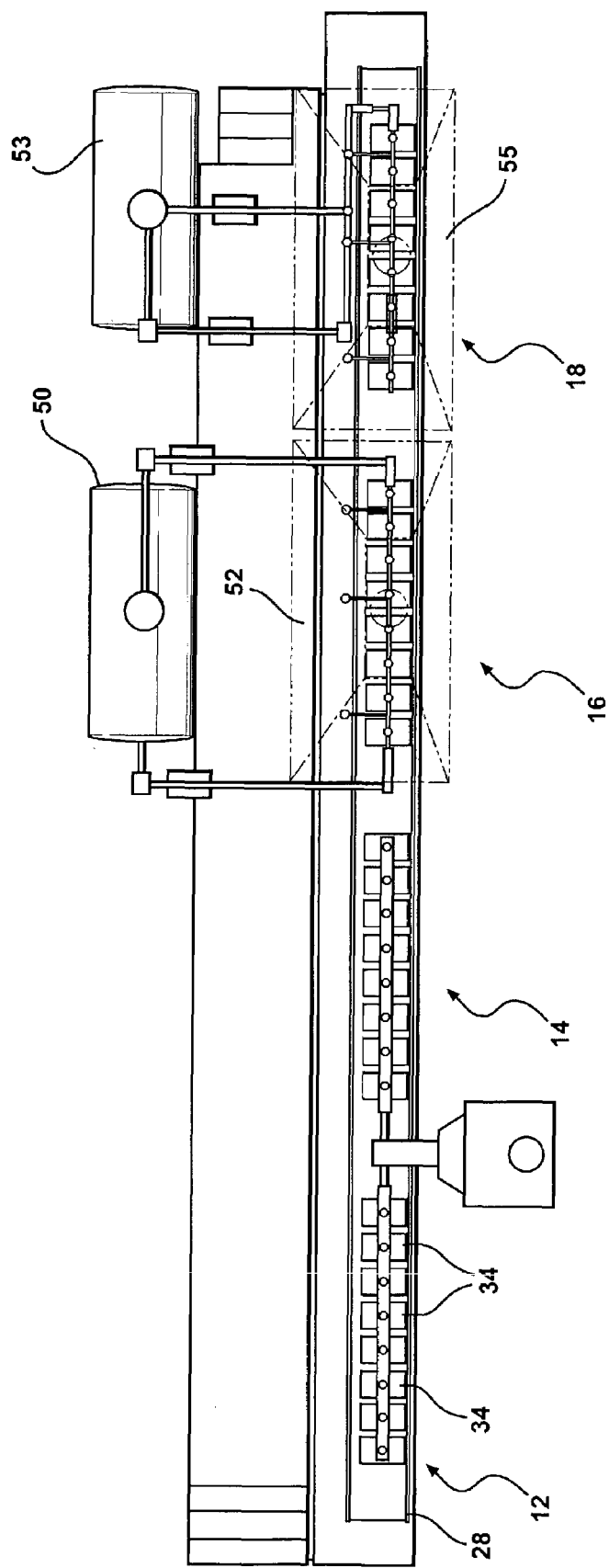
FIG. 1 is a plan view of a processing line to process plastic fuel tanks.
Figure 2:
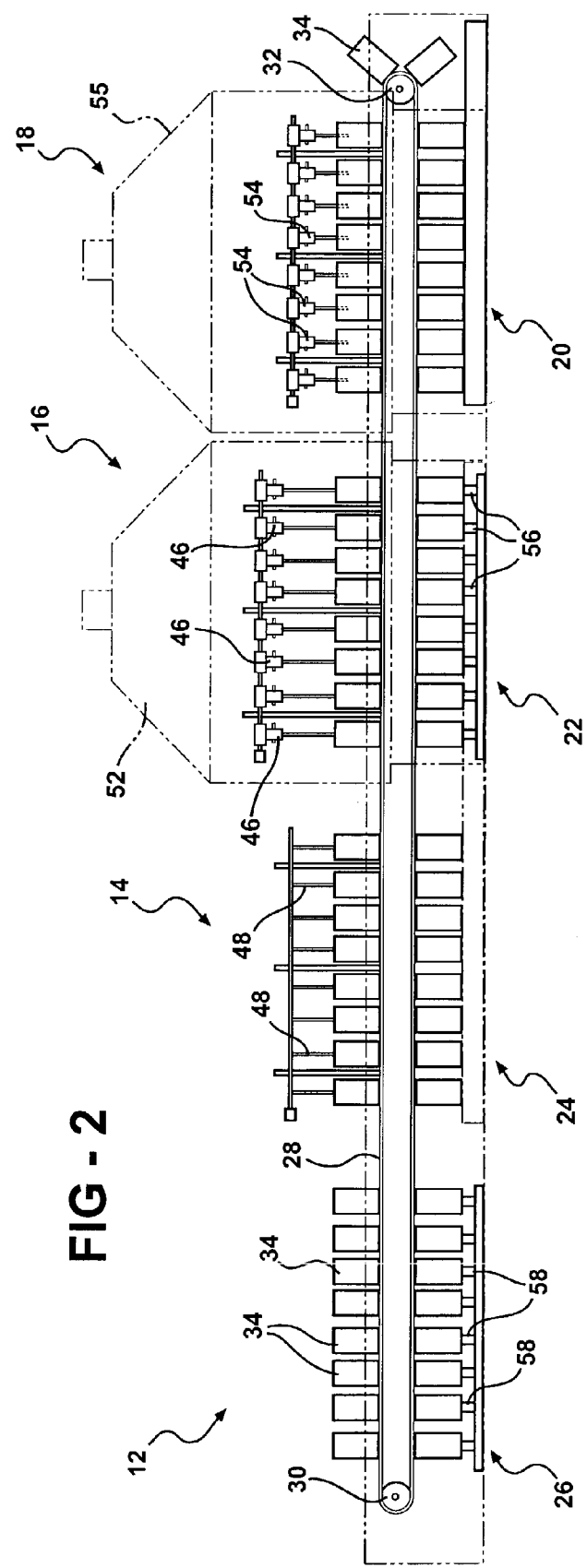
FIG. 2 is a side view of the processing line to process plastic fuel tanks.

Referring to the Figures, wherein like numerals indicate like or corresponding elements throughout the views, FIGS. 1 and 2 show a processing line for processing plastic fuel tanks that includes eight stations, generally shown at 12, 14, 16, 18, 20, 22, 24 and 26. The line includes a conveyor 28 entrained around pulleys or sprockets 30 and 32 for moving fuel tanks 34 through four stations 14, 16, 18 and 20 along the top of the conveyor loop and through four stations 20, 22, 24 and 26 along the bottom of the conveyor loop.

Figure 4:
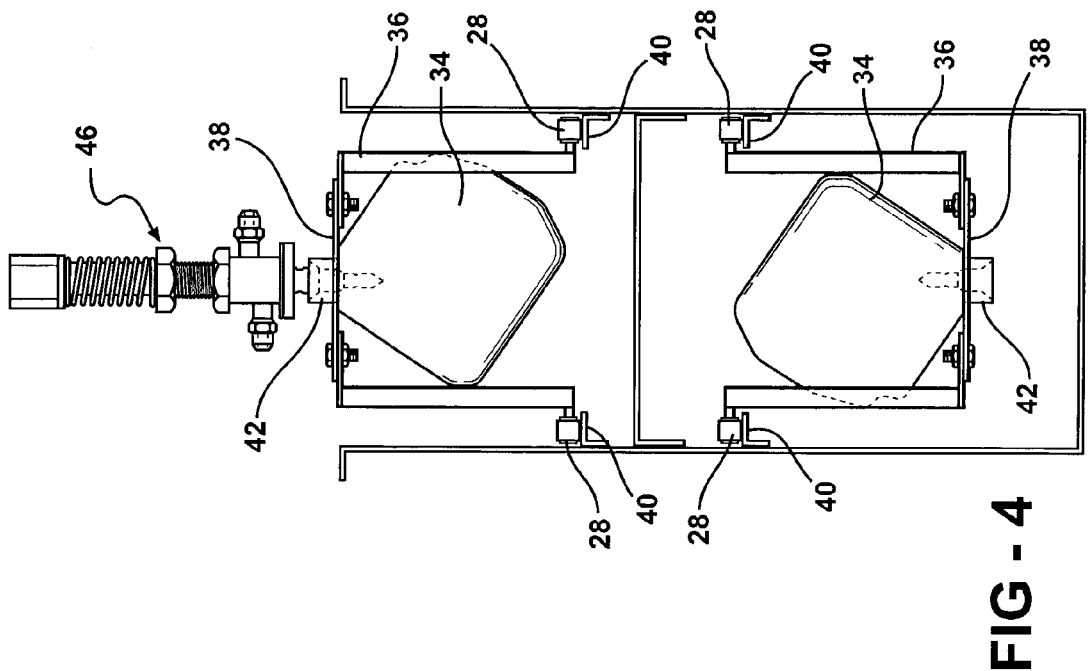
FIG. 4 is a schematic view of the carriers holding the plastic fuel tanks on the conveyor.
Figure 3:
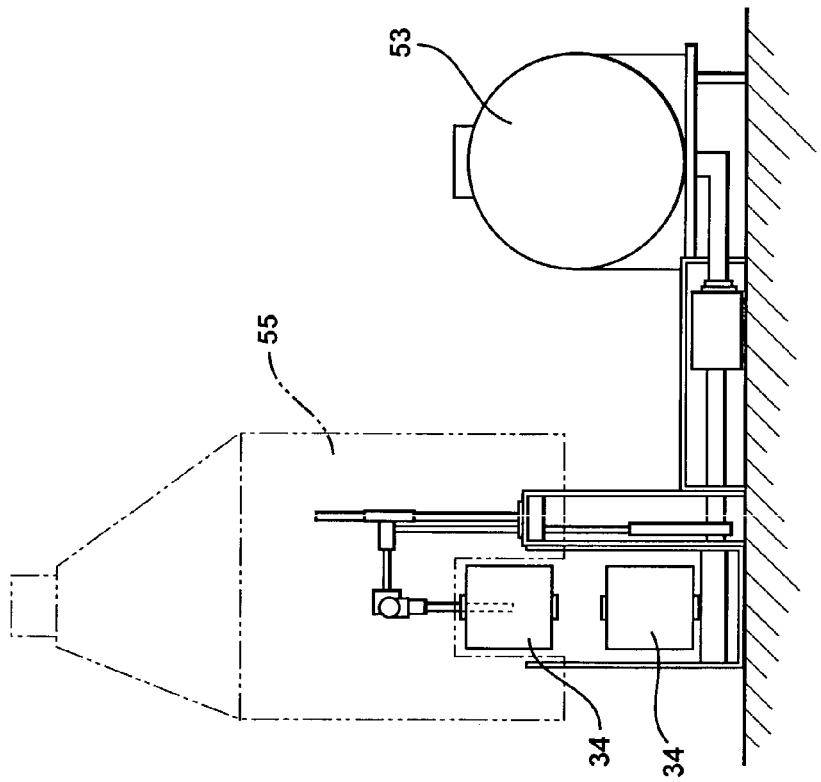
FIG. 3 is an end view of a right end of the processing line.
Figure 5:
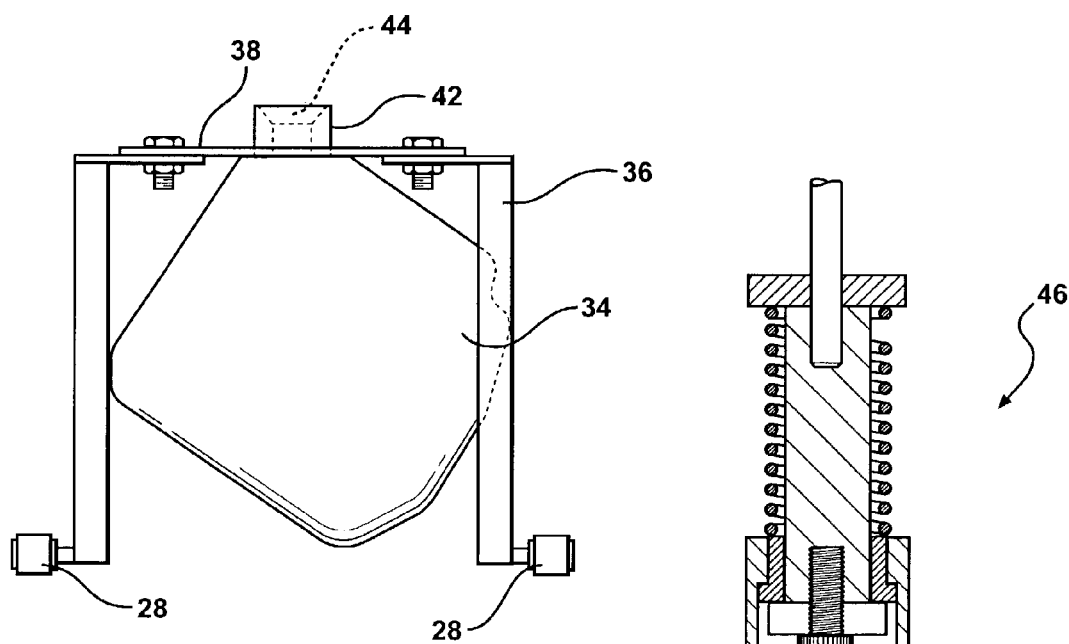
FIG. 5 is a view similar to FIG. 4 but showing one tank supported by a carrier.

The fuel tanks 34 are loaded and unloaded in groups of eight onto the conveyor 28 at a loading station 12. As best viewed in FIGS. 4 and 5, each fuel tank 34 is supported by a carrier 36 that comprises a pair of legs on each side that are, in turn, supported by the conveyor 28. The conveyor 28 includes a loop on each side with rollers running along flanges 40 that are supported by the framework of the line. Each carrier 36 includes a plate 38 having a hole therein for receiving the nozzle of the fuel tank 34. The plastic fuel tanks 34 are loaded in the carriers 36 in an upright position and secured within the carriers 36 by a retainer 42. More specifically, the nozzle or spout of each fuel tank is inserted through the hole in the plate 38 of a carrier 36 and a retainer 42 threadedly engages the spout to hold the fuel tank to the plate 38 of the carrier 36. Each retainer 42 has a tapered lead-in or entry 44 to facilitate a nozzle, generally shown at 46, to enter the spout.

The conveyor 28 moves the carriers 36 with the fuel tanks 34 supported thereby from the loading station 12 to a pre-heat and/or drying station 14 where eight nozzles 48 are moved downwardly by an appropriate actuator (hydraulic or pneumatic) and into the spouts of the various tanks 34. A timer determines how long the pre-heated air is injected into the tanks 34 in the pre-heat station 14. Hot and dry air is important to create a dry environment to speed up a chemical reaction when SO3 is applied in the next station 16, which is a hydrocarbon permeation barrier station.

The barrier station 16 includes a plurality (eight) of the nozzles 46 for injecting $SO_3$ into and extracted from the plastic fuel tanks 34. Although $SO_3$ is preferred, other suitable fluids, liquid or gas, may be used. The barrier creating $SO_3$ is stored in a tank 50 for flow through the nozzles 46. The conveyor is stopped by an appropriate control system to align the nozzles 46 with the retainers 42 and appropriate actuators lower the nozzles 46 into the tanks 34 while sealing the nozzles 46 to the spouts of the tanks 34. The $SO_3$ is at approximately fifteen percent (15%) concentration and after circulating in each tank 34 for a predetermined period of time, is pumped out by applying a vacuum to the nozzles 46 and extracted by a hood 52 and vented to another storage tank or chemical scrubber (not shown) or allowed to escape via a non restricted opening. The time to create the permeation barrier depends upon ambient temperature and humidity, the concentration of the $SO_3$ gas, the material and size of the fuel tank 34. After the predetermined time of treatment, the nozzles 46 are retracted and the tanks 34 are moved to the next station 18, which is a neutralization station.

A number of neutralizers can be used but the preferred is aqueous ammonia. Another gang of nozzles 54 are lowered into the spouts of the tanks 34 in the neutralizing station 18 where ammonia is injected into the plastic fuel tanks 34 and pumped out after a short period of time. A tank 53 supplies the ammonia and a hood 55 collects fumes in the neutralizing station 18.

After neutralizing, the plastic fuel tanks 34 are carried by the conveyor 28 around the end sprocket 32 to an inverted position in a drain station 20 for draining a residue from the respective tanks 34.

The conveyor 28 moves the inverted tanks 34 from the drain station 20 to the rinse station 22, which is directly under the barrier station 16. The inverted plastic fuel tanks 34 are rinsed with a water by a plurality of nozzles 56 located below the line, which inject the water into the inverted plastic fuel tanks 34 at a high pressure. The inverted tanks 34 move into a second drain station 24 and then into the final station 26 where blowers 58 subject the interior of the tanks 34 to hot air for drying. Finally the tanks 34 are moved around the sprocket 30 to the upright position in the loading and unloading station 12.

Figure 6:
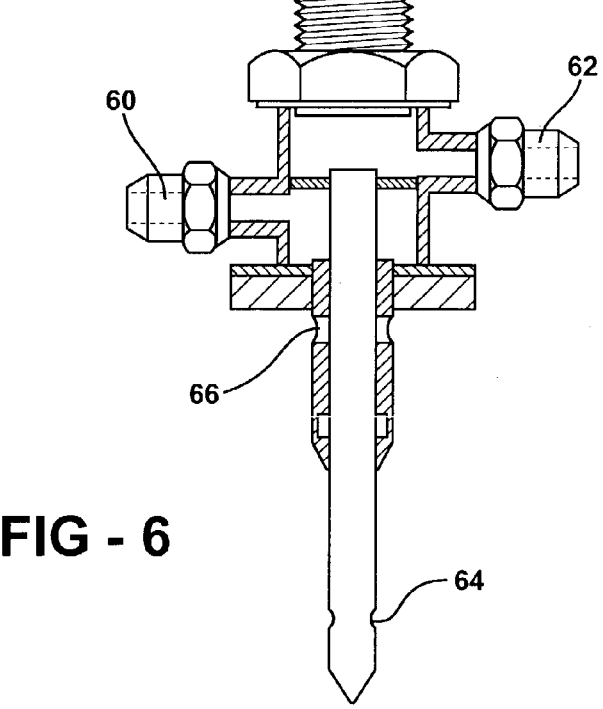
FIG. 6 is a side view of the nozzle use to inject a barrier gas into the fuel tanks.

Referring back to FIG. 6, the nozzle 46 includes different and independent ports 60 and 62 for injecting and removing the $SO_3$ through orifices 64 and 66 respectively.

A sensor maintains 15% gas, level in monitoring $SO_3$ during the injection of $SO_3$ into the plastic fuel tanks (not shown).

Accordingly, the invention provides a conveyor line for processing plastic fuel tanks 34 to create a hydrocarbon barrier within the tanks 34. The line comprises an endless loop conveyor 28 entrained around a spaced pair of sprockets 30, 32 to create an upper plurality of stations 12, 14, 16 and 18 and a lower plurality of stations 20, 22, 24 and 26. A plurality of carriers 36 support the tanks 34 on the conveyor 28 and each of the carriers 36 includes a plate 38 with a hole threrethrough for receiving the spout of a fuel tank 34. A retainer 42 engages the spout of the fuel tank 34 extending through the hole for retaining the tank 34 to the carrier 36.

A barrier station 16 has a plurality of nozzles 46 for engaging the retainers 42 and injecting gas into the tanks 34. A neutralizing station 18 has a second plurality of nozzles 54 for injecting a neutralizing substance into the tanks. At least one drain station 20 or 24 is disposed under the aforementioned or first plurality of stations for draining the tanks 34 while inverted. Additionally, at least one drying station 22 or 26 is disposed under the aforementioned or first plurality of stations for drying the tanks 34 while inverted.

The method of applying a hydrocarbon permeation barrier inside plastic fuel tanks comprises the steps of pre-heating 14 the interior of the tank 34 with air, injecting 16 a hydrocarbon barrier substance into a fuel tank 34 while the tank 34 is upright, withdrawing 16 the barrier substance from the tank 34, injecting 18 a neutralizing substance into the tank 34, inverting 32 the tank 34 and draining 20 the neutralizing substance, and drying 22 and 26 the interior of the tank 34.

The method is particularly defined as holding the fuel tank 34 by a spout of the fuel tank 34 with a conveyor 28 and moving the tank 34 through a plurality of stations while held by the spout. The tank is moved through a first plurality of stations 12, 14, 16 and 18 while upright followed by being moved through a second plurality of stations 20, 22, 24 and 26 while inverted. In the preferred method, a retainer 42 having a hole therethrough for receiving a nozzle engages the spout of the tank 34.

In a more specific sense, the method steps include loading a plurality plastic fuel tanks 34 in carriers 36 in an upright position; securing the plastic fuel tanks 34 within the carriers 36 by retainers 42 engaging the spouts thereof; placing the carriers 36 with the plastic fuel tanks 34 under a plurality of air nozzles 48; injecting hot and dry air through the air nozzles 48 and into the plastic fuel tanks 34; injecting $SO_3$ into the spouts of the plastic fuel tanks 34 through nozzles 46 while sealing the spouts for a predetermined period of time, after which the $SO_3$ is extracted from the plastic fuel tanks 34 through the nozzles while in sealing engagement with the spouts. The continuous flow of $SO_3$ injected is extracted at the same rate. This station of $SO_3$ injection is the station that determines the timing for all stations.

Thereafter the method continues by injecting ammonia into the plastic fuel tanks through a plurality of neutralizing nozzles 54; holding ammonia in the plastic fuel tanks for a second predetermined period of time; and extracting ammonia out of the plastic fuel tanks. The plastic fuel tanks are inverted to drain out a residue of ammonia followed by rinsing the inside of the inverted plastic fuel tanks with high-pressure water and draining the water from the inverted tanks. Finally, the method concludes by blowing a high velocity and heated air into the spouts of the plastic fuel tanks to remove the residue of water.

The number of carriers 36 vary according to the size and shape of tanks 34 to be processed.

Obviously, many modifications and variations of the present invention are possible in light of the above teachings. The invention may be practiced otherwise than as specifically described within the scope of the appended claims wherein the reference numerals are merely for convenience and are not to be read in any way as limiting.

What is claimed is:

1. A conveyor line for processing plastic fuel tanks to create a hydrocarbon barrier within the tanks, the line comprising;

an endless loop conveyor entrained around a spaced pair of sprockets to define a top loop for an upper plurality of stations and a bottom loop for a lower plurality of stations, a plurality of carriers for supporting the tanks inverted in the bottom loop and upright in the top loop on said conveyor, each of said carriers including a plate with a hole therethrough for receiving the spout of a fuel tank, and a retainer for engaging the spout of the fuel tank extending through said hole for retaining the tank to said plate and holding the tank inverted solely with the retainer while moved through the bottom loop and holding the tank upright solely with the retainer while moved through the top loop, a plurality of nozzles for simultaneously engaging said retainers of a plurality of said tanks and injecting gas into said plurality of said tanks while upright in a barrier station in said top loop, a second plurality of nozzles for injecting a neutralizing substance into said tanks while upright in a neutralizing station in said top loop, and said lower plurality of stations including at least one drain station in said bottom loop for draining said tanks while inverted and at last one drying station in said bottom loop for drying said tanks while inverted.

2. A line as set forth in claim 1 wherein said retainer includes a tapered entry to facilitate entry of a nozzle.

* * * * *